(12) United States Patent
Choi et al.

(10) Patent No.: US 8,685,261 B2
(45) Date of Patent: Apr. 1, 2014

(54) METHODS OF MANUFACTURING SURFACE LIGHT SOURCE DEVICES

(75) Inventors: Yoon-sun Choi, Yongin-si (KR); Hong-seok Lee, Seongnam-si (KR); Myoung-seong Kim, Bucheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 594 days.

(21) Appl. No.: 12/926,126

(22) Filed: Oct. 27, 2010

(65) Prior Publication Data

US 2011/0163066 A1 Jul. 7, 2011

(30) Foreign Application Priority Data

Jan. 6, 2010 (KR) .................. 10-2010-0000903

(51) Int. Cl.
*B44C 1/22* (2006.01)

(52) U.S. Cl.
USPC ................. 216/31; 216/62; 216/87; 216/89

(58) Field of Classification Search
USPC .......................... 216/31, 62, 87, 89
See application file for complete search history.

(56) References Cited

U.S. PATENT DOCUMENTS

| 6,060,157 A * | 5/2000 | LaPerre et al. ............... 428/325 |
| 2007/0133090 A1* | 6/2007 | Adachi et al. ................ 359/453 |
| 2011/0217544 A1* | 9/2011 | Young et al. .................. 428/327 |

FOREIGN PATENT DOCUMENTS

| JP | 2006-128072 | 5/2006 |
| JP | 2007-329007 | 12/2007 |
| JP | 2008-171796 | 7/2008 |
| KR | 10-2007-0028396 | 3/2007 |
| KR | 10-2007-0112213 | 11/2007 |

* cited by examiner

*Primary Examiner* — Binh X Tran
(74) *Attorney, Agent, or Firm* — Harness, Dickey & Pierce, P.L.C.

(57) ABSTRACT

Provided are methods of manufacturing a surface light source device, the methods include forming a first structure that includes a first substrate and a plurality of glass beads each partially embedded in the first substrate. A second structure is formed that includes a second substrate and an adhesive material layer formed on the second substrate. The first structure and the second structure are adhered to each other in such a way that the glass beads are each partially embedded into the adhesive material layer.

18 Claims, 4 Drawing Sheets

METHODS OF MANUFACTURING SURFACE LIGHT SOURCE DEVICES

CROSS-REFERENCE TO RELATED APPLICATIONS

This application claims priority under 35 U.S.C. §119 from Korean Patent Application No. 10-2010-0000903, filed on Jan. 6, 2010, in the Korean Intellectual Property Office, the disclosure of which is incorporated herein by reference in its entirety.

BACKGROUND

1. Field

Example embodiments relate to methods of manufacturing surface light source devices.

2. Description of the Related Art

A surface light source device is a device for converting light emitted by a point light source or a linear light source into surface emission light and outputting the surface emission light. For example, a surface light source device is used as an image-forming light source of a liquid crystal display (LCD) device, which does not emit light by itself and forms an image by receiving external light. A surface light source device is used as a backlight unit in a transmissive LCD device, and is used as a front light unit in a reflective LCD device.

A general surface light source device has a structure in which various emission structures are formed on a light-guiding panel so that light incident on a side of the light-guiding panel is emitted from the light-guiding panel via a top surface of the light-guiding panel. For example, a structure in which a prism structure is adhered to the top surface of a light-guiding panel may be used as the emission structure. In this case, interference of light due to an adhesive layer may deteriorate light emission efficiency. A structure in which an emission structure is integrated into a light-guiding panel without using an adhesive layer may be used. However, in this case, it may be difficult to inject-mold such a structure depending on the shape of the emission structure. Various designs of surface light source devices are suggested for increased optical performance and miniaturization.

SUMMARY

Provided are methods of manufacturing surface light source devices.

Additional aspects will be set forth in part in the description which follows and, in part, will be apparent from the description, or may be learned by practice of the presented embodiments.

According to example embodiments, a method of manufacturing a surface light source device includes forming a first structure that includes a first substrate and a plurality of glass beads each partially embedded into the first substrate, forming a second structure that includes a second substrate and an adhesive material layer formed on the second substrate; and adhering the first structure and the second structure to each other in such a way that each of the glass beads is partially embedded into the adhesive material layer.

Forming the first structure includes embedding a first portion of each of the plurality of glass beads into the first substrate such that a second portion of each of the plurality of glass beads protrudes from a first surface of the first substrate.

Adhering the first structure and the second structure to each other includes partially embedding the second portion of each of the plurality of glass beads into the adhesive material layer.

The first structure may be formed by distributing the glass beads on a melt transparent material. A thickness of the first substrate may be smaller than or equal to a radius of the glass beads.

The transparent material may be polymethyl methacrylate (PMMA), polycarbonate (PC), a silicon rubber or a similar material.

A thickness of the adhesive material layer may be approximately within 10% of a radius of the glass beads. The adhesive material layer may be formed of a pressure sensitive adhesive (PSA).

The first structure and the second structure may be adhered to each other via a roll-to-roll method.

The method may further include forming a diffusing layer on a second surface of the first substrate opposite to the first surface from which the plurality of glass beads protrude. The diffusing layer may be formed of a plurality of diffusing particles embedded into a transparent substrate, and the diffusing particles may be formed of topaz. The diffusing layer may be formed before or after the first structure and the second structure are adhered to each other.

The method may further include removing the first substrate and the first portion of the glass beads embedded into the first substrate after the first structure and the second structure are adhered to each other. The first substrate and the first portion of the glass beads embedded into the first substrate may be removed by etching or polishing.

The method may further include forming scratches on cutting surfaces of the glass beads in order to diffuse emitted light. The cutting surfaces are a result of removing the first portion of the glass beads embedded into the first substrate.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
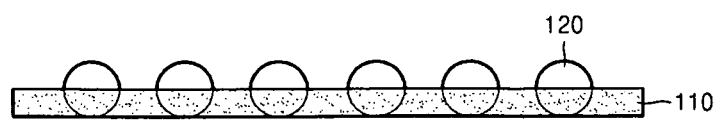
FIGS. 1A, 1B and 1C are diagrams for describing a method of manufacturing a surface light source device according to example embodiments.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention. In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In order to more specifically describe example embodiments, various aspects will be described in detail with reference to the attached drawings. However, the present invention is not limited to example embodiments described.

Example embodiments relate to methods of manufacturing surface light source devices.

Figure 1B:
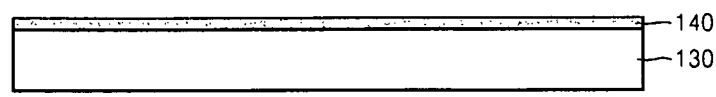
Figure 1C:
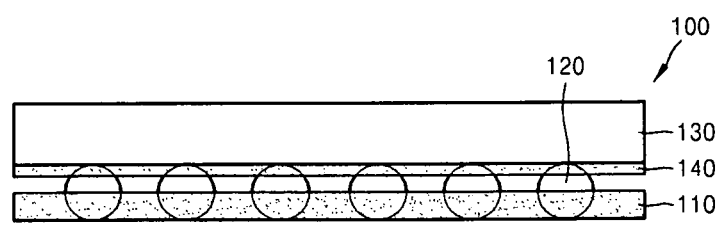

FIGS. 1A, 1B and 1C are diagrams for describing a method of manufacturing a surface light source device according to example embodiments.

Referring to FIG. 1A, a structure including a first substrate 110 and a plurality of glass beads 120 is formed. Portions of each of the plurality of glass beads 120 are partially embedded into the first substrate 110, and remaining portions of each of the plurality of glass beads 120 protrude from the first substrate 110. The structure may be formed by distributing the glass beads 120 on a melt transparent material.

The glass beads 120 are employed for forming an emission structure in a surface light source device to be manufactured. In FIG. 1A, the glass beads 120 are distributed throughout the first substrate 110 to have a uniform density. However, the distribution shown is merely an example. The distribution of the glass beads 120 may be determined based on a position of a light source and brightness distribution. For example, the plurality of glass beads 120 may be distributed in such a way that the glass beads 120 are more densely distributed the further the glass beads 120 are from a light source. Furthermore, in FIG. 1A, the plurality of glass beads 120 are uniformly-sized, but the configuration shown is merely an example. The sizes of the glass beads 120 may vary if necessary.

The melt transparent material may be polymethyl methacrylate (PMMA), polycarbonate (PC), a silicon rubber or a similar material. The refractive index of the glass beads 120 is approximately 1.5, and a material having substantially the same refractive index is selected as the transparent material.

The thickness of the first substrate 110 may be smaller than a diameter of the glass beads 120 so that portions of the glass beads 120 protrude from the first substrate 110. The thickness of the first substrate 110 may be less than or equal to the radius of each of the glass beads 120. For example, the thickness of the first substrate 110 may be approximately same as the radius of a single glass bead 120.

Referring to FIG. 1B, an adhesive material layer 140 is formed on a second substrate 130. The adhesive material layer 140 may be formed of a pressure sensitive adhesive (PSA), for example. The PSA is a functional adhesive material that becomes adhesive according to a pressed shape when a pressure is applied thereto. The second substrate 130 may be formed of a transparent material (e.g., PMMA, PC, a silicon rubber or the like). The second substrate 130 and the adhesive material layer 140 are formed of materials with substantially the same refractive indexes as that of the glass beads 120.

Referring to FIG. 1C, the structure shown in FIG. 1A and the structure shown in FIG. 1B are arranged stacked on (or to overlap) each other in such a way that a portion of the exposed portion of the glass beads 120 are embedded into the adhesive material layer 140. When the adhesive material layer 140 is hardened, the surface light source device 100 is manufactured.

Figure 2A:
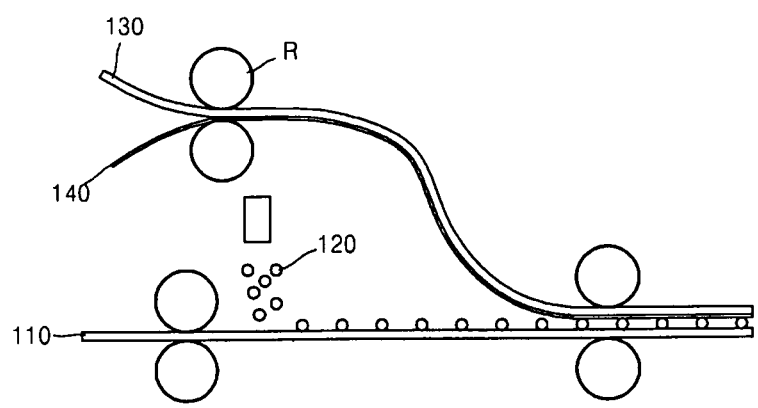
FIGS. 2A and 2B are diagrams for describing a method of manufacturing a surface light source device according to example embodiments.
Figure 2B:
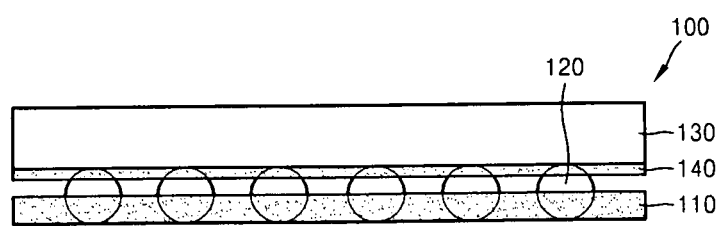

FIGS. 2A and 2B are diagrams for describing a method of manufacturing a surface light source device according to example embodiments.

FIG. 2A shows that the manufacturing process shown in FIGS. 1A, 1B and 1C is performed via a roll-to-roll method. FIG. 2B shows a surface light source device manufactured according to the process shown in FIG. 2A.

Referring to FIG. 2A, the glass beads 120 are dispersed on the first substrate 110. The dispersed glass beads 120 and the first substrate 110 are heated and pressed by using a roller R. The second substrate 130 and the adhesive material layer 140 are also adhered to each other using a roller R. The first substrate 110 (on which the plurality of glass beads 120 are formed) and the second substrate 130 (on which the adhesive material layer 140 is formed) are adhered to each other by using a roller R. Accordingly, the surface light source device 100 as shown in FIG. 2B is manufactured. When performing the roll-to-roll manufacturing method as described above, it is easy to manufacture a relatively large surface light source device and to mass-produce the surface light source device 100.

Figure 3:
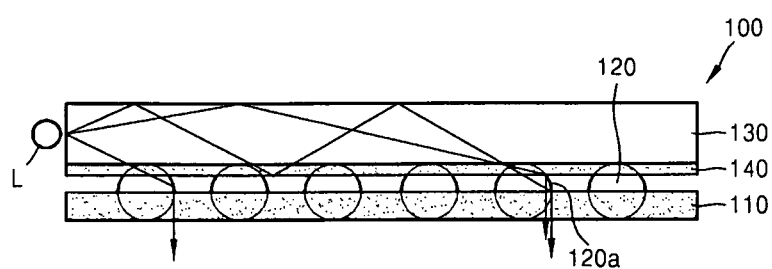
FIG. 3 is a diagram showing a light path in which light emitted by a light source travels in a manufactured surface light source device according to example embodiments.

FIG. 3 is a diagram showing a light path in which light emitted by a light source travels in a manufactured surface light source device according to example embodiments.

Referring to FIG. 3, light emitted by a light source L is totally reflected (i.e., incident at an angle at which total reflection does occur) at inner walls of the second substrate 130, and travels within the surface light source device 100. The reflected light within the surface light source device 100 is incident on the glass beads 120. After the light is reflected at side surfaces 120a of the glass beads 120, the light is incident on a surface of the first substrate 110 at an angle at which total reflection does not occur, and is emitted out of the surface light source device 100.

Here, the depth at which the glass beads 120 are embedded into the adhesive material layer 140 affects optical performances (e.g., brightness) of the surface light source device 100. The depth in which the glass beads 120 are embedded into the adhesive material layer 140 is substantially determined by the thickness of the adhesive material layer 140. Thus, the thickness of the adhesive material layer 140 may be determined in consideration of the brightness of emitted light. For example, the thickness of the adhesive material layer 140 may be determined to be approximately within 10% of the radius of the glass beads 120.

Figure 4:
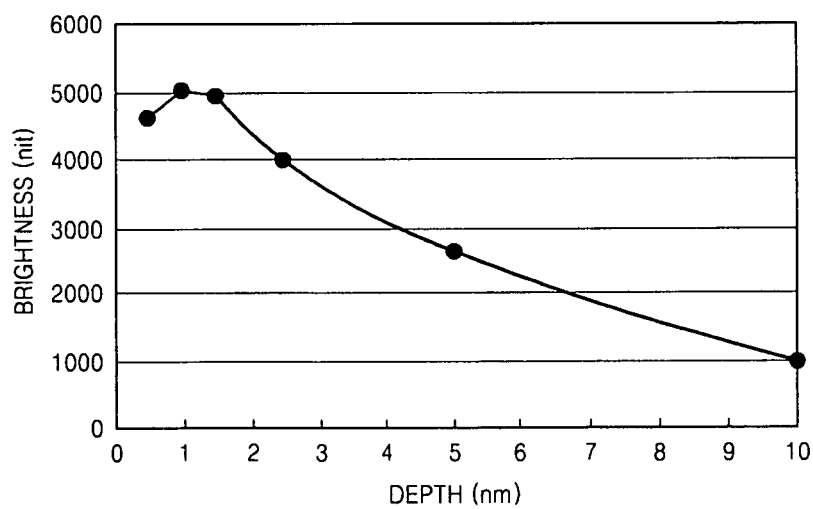
FIG. 4 is a graph showing the brightness of light emitted by the surface light source device with respect to depths in which glass beads are embedded into a adhesive material layer.

FIG. 4 is a graph showing the brightness of light emitted by a surface light source device with respect to depths in which the glass beads are embedded into the adhesive material layer.

In FIG. 4, the graph shows a result of a computer-simulation of the brightness of light with respect to the thickness of the adhesive material layer in a structure in which the glass beads having a radius of 50 um are arranged at an interval of 50 um from each other.

Referring FIG. 4, the brightness peaks when the depth is from about 0.5 um to about 1.5 um.

Figure 5:
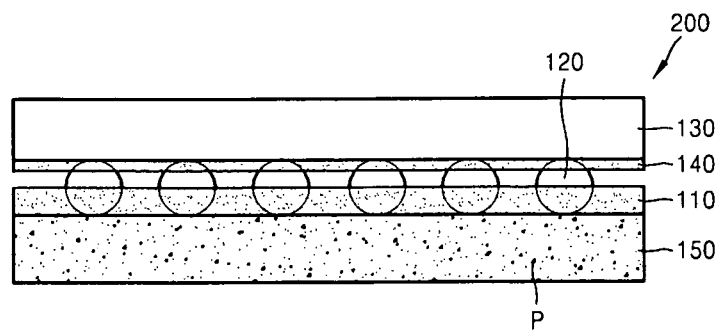
FIG. 5 is a diagram for describing a method of manufacturing a surface light source device according to example embodiments.

FIG. 5 is a diagram for describing a method of manufacturing a surface light source device according to example embodiments.

The surface light source device 200 shown in FIG. 5 is different from the surface light source device 100 shown in FIGS. 1A through 1C in that the surface light source device 200 further includes a diffusing layer 150.

Referring to FIG. 5, the diffusing layer 150 may be formed on a surface of the first substrate 110 opposite to the surface from which the glass beads 120 protrude. The diffusing layer 150 may be employed to increase uniformity of the emitted light. The diffusing layer 150 may be formed by embedding scattering particles p into a transparent material. The scattering particles p may be formed of topaz.

The diffusing layer 150 may be formed either before or after adhering the first substrate 110 (having the plurality of glass beads 120 embedded therein) to the second substrate 130 (on which the adhesive material layer 140 is formed) (e.g., before or after the process shown in FIG. 1C).

Although the diffusing layer 150 is shown in FIG. 5, a prism or a lens array may be formed instead of the diffusing layer 150.

Figure 6:
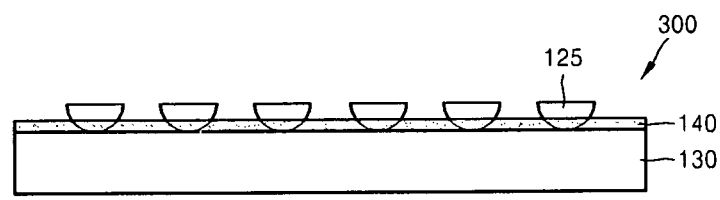
FIG. 6 is a diagram for describing a method of manufacturing a surface light source device according to example embodiments.

FIG. 6 is a diagram for describing a method of manufacturing a surface light source device according to example embodiments.

Referring to FIG. 6, a surface light source device 300 is different from the surface light source device 100 shown in FIG. 1C in that the first substrate 110 and the portions of the glass beads 120 embedded into the first substrate 110 are removed. The first substrate 110 may be removed after adhering the first substrate 110 (having the plurality of glass beads 120 embedded therein) to the second substrate 130 (on which the adhesive material layer 140 is formed) (i.e., after the process shown in FIG. 1C).

The structure shown in FIG. 6 may be formed by cutting the glass beads 120, or by etching or polishing the first substrate 110 and the portions of the glass beads 120 embedded into the first substrate 110. The cut surfaces of hemispherical glass beads 125 become light emitting surfaces. The structure according to example embodiments is suggested in considering that the first substrate 110 is only used to aid manufacturing of a surface light source device and does not affect optical performance of the surface light source device. Accordingly, a surface light source device may become slimmer by removing the first substrate 110.

Figure 7:
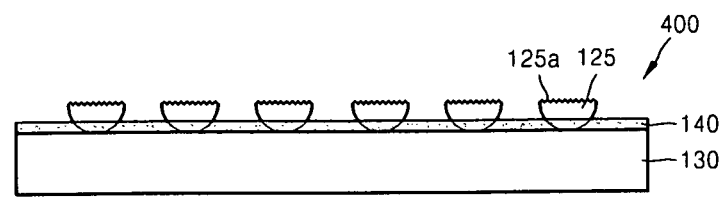
FIG. 7 is a diagram for describing a method of manufacturing a surface light source device according to example embodiments.

FIG. 7 is a diagram for describing a method of manufacturing a surface light source device according to example embodiments.

Referring to FIG. 7, in a surface light source device 400, scratches 125a are formed on the cut surfaces of the glass beads 125. The cut surfaces of the glass beads 125 become the light emitting surfaces. The scratches 125a are for diffuse-mixing emitted light.

According to the methods of manufacturing surface light source device described above, it is easier to manufacture a relatively large surface light source device and/or to mass-produce surface light source devices.

A surface light source device manufactured according to the methods described above is manufactured as a single body having a sheet-less structure, and thus optical performance thereof increases. Therefore, the surface light source device may be used as a light source for forming images or as a large wall lighting device.

It should be understood that example embodiments described therein should be considered in a descriptive sense only and not for purposes of limitation. Descriptions of features or aspects within each example embodiment should typically be considered as available for other similar features or aspects in other example embodiments.

What is claimed is:

1. A method of manufacturing a surface light source device, the method comprising:
   forming a first structure including a first substrate and a plurality of glass beads each partially embedded into the first substrate;
   forming a second structure including a second substrate and an adhesive material layer formed on the second substrate, the second substrate having a fist surface on which the adhesive material layer is on,a second surface opposite to the first surface and a third surface connecting the first surface and the second surface;
   adhering the first structure and the secondstructure to each other such that the plurality of glass beads are partially embedded into the adhesive material layer; and
   disposing a light source adjacent to the third surface so that a light from the light source can be incident to the surface light source device via the third surface and emitted from the surface light source device via the first structure, 2. The method of claim 1, wherein the first substrate has a thickness smaller than or equal to a radius of each of the plurality of glass beads.

3. The method of claim 1, wherein the adhesive material layer has a thickness approximately within 10% of a radius of each of the plurality of glass beads.

4. The method of claim 1, wherein the first structure and. the second structure are adhered to each other via a roil-to-roll method.

5. The method of claim 1, wherein the second substrate is formed of at least one selected from the group consisting of polymethyl methacrylate (PMMA), polycarbonate (PC) and silicon rubber.

6. The method of claim 1, wherein the adhesive material layer is formed of a pressure sensitive adhesive (PSA).

7. The method of claim 1, wherein the first structure is formed by distributing the plurality of glass beads on a melt transparent material.

8. The method of claim 7, wherein the melt transparent material is at least one selected from the group consisting of polymethyl methacrylate (PMMA), polycarbonate (PC) and silicon rubber.

9. The method of claim 1, wherein forming the first structure includes embedding a first portion of each of the plurality of glass beads into the first substrate such that a second portion of each of the plurality of glass beads protrudes from a first surface of the first substrate.

10. The method of claim 9, wherein adhering the first structure and the second structure to each other includes partially embedding the second portion of each of the plurality of glass beads into the adhesive material layer.

11. The method of claim 9, further comprising:
    forming a diffusing layer on a second surface of the first substrate opposite to the first surface from which the plurality of glass beads protrude.

12. The method of claim 11, wherein the diffusing layer is formed after the first structure and the second structure are adhered to each other.

13. The method of claim, 11, wherein the diffusing layer is formed before the first structure and the second structure are adhered to each other.

14. A method of manufacturing a surface light source device, the method comprising:
    forming a first structure including a first substrate and a plurality of glass beads each partially embedded into the first substrate;
    forming a second structure including a second substrate and an adhesive material layer formed on the second substrate, the second substrate having a first surface on which the adhesive material layer is formed on, a second surface opposite to the first surface and a third surface connecting the first surface and the second surface;
    adhering the first structure and the second structure to each other such that the plurality of glass beads are each partially embedded into the adhesive material layer; and
    wherein forming the first structure includes embedding a first portion of each of the plurality of glass beads into the first substrate such that a second portion of each of the plurality of glass beads protrudes from a first surface of the first substrate; and
    forming a diffusing layer on a second surface of the first substrate opposite to the first surface of the first substrate from which the plurality of glass beads protrude;
    wherein the diffusing layer is formed of a plurality of diffusing particles embedded into a transparent substrate.

15. The method of claim 14, wherein the plurality of diffusing particles are formed of topaz.

16. A method of manufacturing a surface light source device, the method comprising:
    forming a first structure including a first substrate and a plurality of glass beads each partially embedded into the first substrate;
    forming a second structure including a second substrate and an adhesive material layer formed on the second substrate, the second substrate having a first surface on which the adhesive material layer formed on, a second surface opposite to the first surface and third surface connecting the surface and the second surface;
    adhering the first structure and the second structure to each other such that the plurality of glass beads are each partially embedded into the adhesive material layer; and
    removing the first substrate and portions of the plurality of glass beads embedded into the first substrate after the first structure and the second structure are adhered to each other.

17. The method of claim 16, wherein the first substrate and the portions of the glass beads embedded into the first substrate are removed by etching or polishing.

18. The method of claim 16, further comprising:
    forming scratches, for diffusing emitted light, on cut surfaces of the glass beads, the cut surfaces being formed during the removal of the portions of the glass beads embedded into the first substrate.

* * * * *